United States Patent [19]

Roth et al.

[11] 4,070,760
[45] Jan. 31, 1978

[54] MICROMETER

[76] Inventors: Leo Roth; Ursula Roth, both of 52-27 69th St., Maspeth, N.Y. 11378

[21] Appl. No.: 745,091

[22] Filed: Nov. 26, 1976

[51] Int. Cl.² ............................................. G01B 3/18
[52] U.S. Cl. .................................. 33/166; 33/164 R; 33/DIG. 1
[58] Field of Search ..................... 33/163, 164 R, 166, 33/167, 170, DIG. 1

[56] References Cited

U.S. PATENT DOCUMENTS

| 288,736 | 11/1883 | Remacle | 33/164 R |
|---|---|---|---|
| 411,444 | 9/1889 | Irmen | 33/164 R |
| 459,672 | 9/1891 | Bernhardt | 33/166 |
| 1,591,740 | 7/1926 | Brewer | 33/166 |
| 2,275,036 | 3/1942 | Schwartz | 33/DIG. 1 |
| 2,891,416 | 6/1959 | Pfeiffer | 33/DIG. 1 |
| 2,976,613 | 3/1961 | Shields | 33/DIG. 1 |

Primary Examiner—Richard E. Aegerter
Assistant Examiner—Richard R. Stearns

[57] ABSTRACT

A vertical upright U-shaped member has two parallel legs with parallel vertical inner and outer surfaces, the inner surfaces being adjacent and parallel to each other, one leg having a horizontal bore extending transversely between its inner and outer surfaces and disposed adjacent the upper end of this leg. A sleeve is removably disposed in the bore. A flat disc lies in a vertical plane and is secured to the inner surface of the other leg, with its center aligned with the bore axis. A shaft engages the sleeve, with a front non-magnetic portion extending through the bore into the space between the legs and with a rear magnetic portion extending outwardly from the outer surface of the one leg. Another disc parallel to the one disc is secured to the front end of the shaft. An elongated cylinder having a horizontal axis has at one end a magnetic element coupled to the rear end of the shaft. Manual rotation of the cylinder causes the shaft to rotate. A helical hollow conduit in the outer cylinder surface has an axis coincident with the cylinder axis. A sphere in the conduit cooperates with a calibrated scale along the conduit to measure the extent of cylinder rotation.

7 Claims, 5 Drawing Figures

MICROMETER

BACKGROUND OF THE INVENTION

Conventional micrometers employ a manually rotatable hollow cylinder having a shaft telescoped therein whereby rotation of the shaft in one direction or the reverse causes the shaft to be extended or retracted. Gross and fine scales on the shaft and cylinder enable the shaft position to be measured quite accurately. When different scales are required, different micrometers are used. The micrometer is normally a precision instrument using a significant number of expensive parts and assembled with care by skilled artisans.

This invention is directed toward a micrometer which can be assembled quickly and easily by unskilled labor using a few relatively inexpensive parts. A portion of the micrometer in accordance with the invention can be removed and replaced quickly and easily to change scales as required.

SUMMARY OF THE INVENTION

A micrometer in accordance with the invention employs a vertical upright U-shaped member having two parallel legs, each leg having parallel vertical inner and outer surfaces, the inner surfaces of the legs being disposed adjacent and parallel to each other, one of the legs having a horizontal threaded bore extending transversely between its outer and inner surfaces, the bore being disposed adjacent the upper end of the said one leg. A sleeve having an internal thread is removably disposed on the bore. One flat disc lying in a vertical place is secured to the inner surface of the other leg, the disc having its center aligned with the axis of said bore.

A threaded shaft threadedly engaging the sleeve has a front portion which extends through the bore into the space between the legs and has a rear portion which extends outwardly from the outer surface of said one leg, the front portion being non-magnetic, the rear portion being magnetic. Another like flat disc parallel to the said one flat disc is secured to the front end of said shaft.

The micrometer further employs an elongated cylinder having a horizontal axis, one end of the cylinder being provided with magnetic means for magnetically connecting said cylinder to the rear end of the shaft, the axis of shaft and cylinder being coincident whereby manual rotation of the cylinder about the coincident axes causes the shaft to rotate about the coincident axes.

The cylinder is provided with a helical hollow conduit in its outer surface which has an axis coincident with the axis of the cylinder.

A sphere which can be a bubble or a ball is disposed in said conduit and a calibrated scale is disposed along said conduit whereby the position of said sphere on said scale provides an accurate measure of the degree of rotation of said cylinder with respect to a preselected measurement point.

The micrometer can then be used in usual manner for measurements. Changes of scale are made replacing the sleeve and shaft with a sleeve and shaft having a different number of threads per inch or centimeter. Because of the magnetic action, the cylinder can be removed and replaced easily and quickly.

DETAILED DESCRIPTION OF PREFERRED EMBODIMENT

Figure 1:
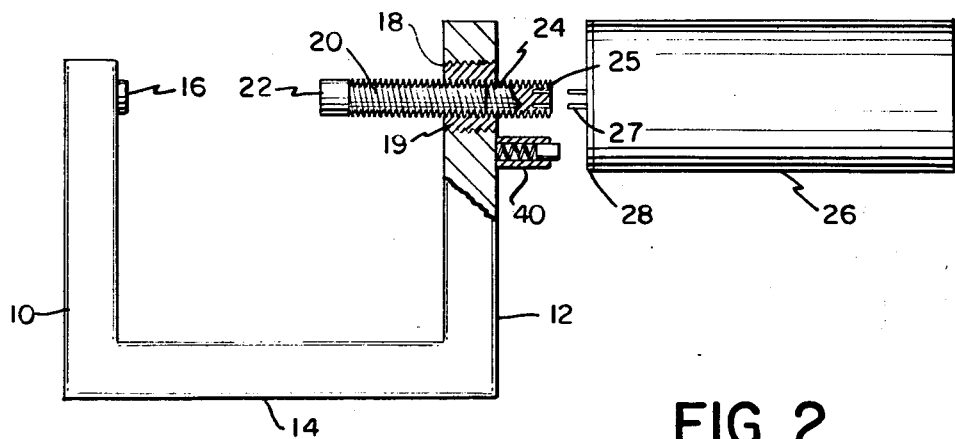
FIG. 1 is a side view of the invention.
Figure 2:
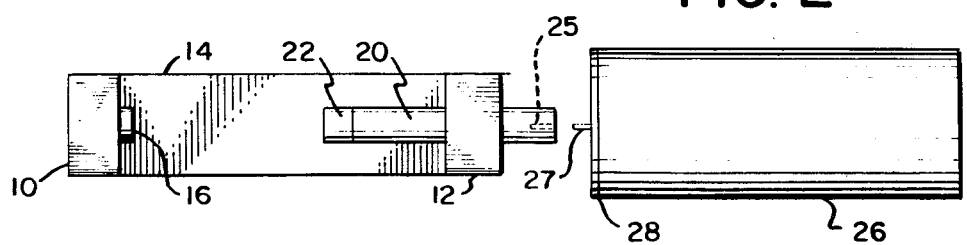
FIG. 2 is a top view thereof.
Figure 3:
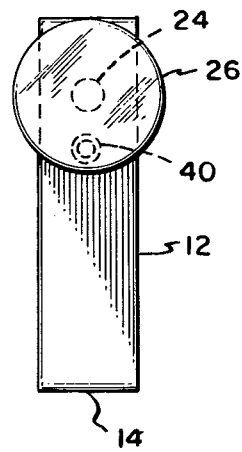
FIG. 3 is an end view thereof.
Figure 4:
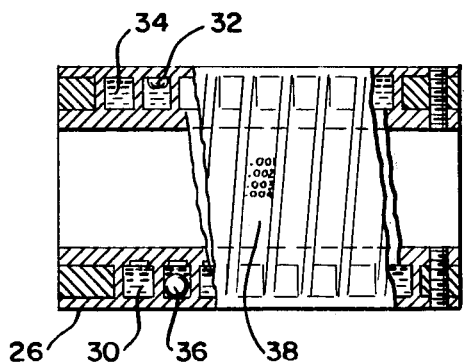
FIG. 4 is a detail side view of the cylinder used in the invention.
Figure 5:
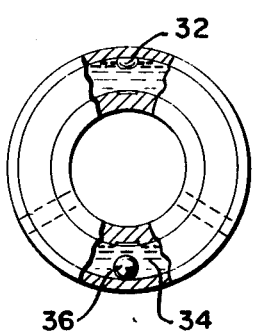
FIG. 5 is a detail end view of the cylinder of FIG. 4.

Referring now to FIGS. 1–5, a plastic rectangular upright U-shaped member has first and second vertical parallel legs 10 and 12 interconnected at bottom by a horizontal cross piece 14. The legs and cross piece are coplanar and in cross section have the shape of a square. The legs have flat vertical inner surfaces which are parallel and adjacent and flat vertical outer surfaces which are parallel to the inner surfaces.

A flat vertical carbide disc 16 is secured to the inner surface of leg 10 adjacent the upper end. Leg 12 contains a horizontal threaded bore 18 extending transversely between inner and outer leg surfaces, the axis of the bore being aligned with the center of disc 16. A hollow sleeve 19 having an internal thread is removably disposed in the bore.

A threaded shaft has a front portion 20 which is non-magnetic with a second like vertical carbide disc 22 being secured to the front end of portion 20. Portion 20 can be made of the same plastic as the U-shaped member. The shaft has a rear portion 24 which is a magnet such as a sintered ferrite which is butted against portion 20, these portions being secured end to end by a suitable cement or other means. The shaft threadedly engages the sleeve and can be rotated therein to move disc 22 toward or away from disc 16. The flat end of portion 24 has two parallel recesses 25 offset from and parallel to the axis of the shaft.

An elongated cylinder 26 has a magnet 28 secured at one end whereby cylinder 26 can be detachably secured by magnetic action to the rear vertical end of portion 24 with the axes of the cylinder and shaft being coincident. The cylinder can be manually rotated about its axis whereby the shaft is also rotated. The magnet 28 has two parallel prongs 27 extending outward at right angles. These prongs engage recesses 25 to lock the shaft and cylinder axes in coincident position.

The cylinder 26 has a helical channel or conduit 30 disposed about the axis of the cylinder in its outer surface. The channel contains a gravity responsive indicator such as a steel ball 36, air bubble 32 and water 34 or other medium, or a drop of mercury or the like which is freely movable along the channel under the influence of gravity as the cylinder is rotated about its horizontal axis. The cylinder is transparent. A scale 38 can be imprinted on the surface of the cylinder along the conduit whereby as the cylinder is rotated from a zero position at one end of the channel, the bubble and ball will move along the channel, the positions providing a direct indication of the total degree of rotation. The bubble will remain in the uppermost portion of the channel while the ball will remain in the bottom of the channel. The scale will be used either for bubble or ball, best results being obtained when two scales are used, one for the ball and the other for the bubble.

Depending upon the pitch and size of the threads of shaft and sleeve, the scales can be calibrated in millimeters, tenths of millimeters, hundreths of millimeters and equivalents in inches whereby the length of an article disposed between the carbide discs can be accurately measured by rotating the cylinder until the discs touch opposite portions of the article and reading the scale.

When desired, the entire structure can be held in a jig and a crank handle detachably secured to the rear end of the cylinder to rotate same.

A spring loaded telescopic stop 40 is secured to leg 12 and is manually held spaced away from the cylinder until it is rotated to the measuring position. The step is then released and bears against the cylinder to lock it in desired position.

We claim:

1. A micrometer comprising:
    a vertical upright U-shaped member having two parallel legs, each leg having parallel vertical inner and outer surfaces, the inner surfaces of the legs being disposed adjacent and parallel to each other, one of the legs having a horizontal threaded bore extending transversely between its outer and inner surfaces, the bore being disposed adjacent the upper end of the said one leg;
    a sleeve having an internal thread and removably disposed in the bore;
    one flat disc lying in a vertical plane and secured to the inner surface of the other leg, the disc having its center aligned with the axis of said bore; and
    a threaded shaft threadedly engaging said sleeve, said shaft having a front portion which extends through the sleeve into the space between the legs and having a rear portion which extends outwardly from the outer surface of said one leg, the front portion being non-magnetic, the rear portion being magnetic.

2. The micrometer of claim 1 wherein another like flat disc parallel to the said one flat disc is secured to the front end of said shaft.

3. The micrometer of claim 2 further including an elongated transparent cylinder having a horizontal axis, one end of the cylinder being provided with magnetic means for magnetically connecting said cylinder to the rear end of the shaft, the axis of the shaft and cylinder being coincident whereby manual rotation of the cylinder about the coincident axes causes the shaft to rotate about the coincident axes.

4. The micrometer of claim 3 wherein said cylinder is provided with a helical hollow conduit adjacent its outer surface which has an axis coincident with the axis of the cylinder.

5. The micrometer of claim 4 wherein a sphere is disposed in said conduit and a calibrated scale is disposed along said conduit whereby the position of said sphere on said scale provides an accurate measure of the degree of rotation of said cylinder with respect to a preselected measurement point.

6. The micrometer of claim 5 wherein said rear portion and the magnetic means have detachable locking apparatus for aligning the axes of the shaft and cylinder.

7. The micrometer of claim 6 including means to functionally lock the cylinder in a desired angular position of rotation.

* * * * *